United States Patent [19]

Monna

[11] 4,019,037

[45] Apr. 19, 1977

[54] ELECTRONIC WRISTWATCH INCORPORATING CALCULATOR

[75] Inventor: Takashi Monna, Suwa, Japan

[73] Assignee: Kabushiki Kaisha Suwa Seikosha, Tokyo, Japan

[22] Filed: Dec. 27, 1972

[21] Appl. No.: 319,070

[30] Foreign Application Priority Data

Dec. 27, 1971 Japan ................................ 46-2875
Dec. 27, 1971 Japan ................................ 46-2876

[52] U.S. Cl. ................................ 235/156; 235/152; 58/50 R; 58/152 R

[51] Int. Cl.² ....................... G06F 7/48; G06F 3/02; G04B 19/30

[58] Field of Search ......... 235/156, 152; 58/152 R, 58/152 E, 24 R, 94, 23 V, 23 TF, 23 BA, 23 A, 23 R

[56] References Cited

UNITED STATES PATENTS

| | | | |
|---|---|---|---|
| 3,431,722 | 3/1969 | Haas | 58/152 R |
| 3,514,939 | 6/1970 | Cattin | 58/23 BA |
| 3,546,696 | 12/1970 | Waters et al. | 235/152 X |
| 3,613,351 | 10/1971 | Walton | 58/23 BA |
| 3,646,751 | 3/1972 | Purland et al. | 58/152 R |
| 3,691,755 | 9/1972 | Girard | 58/23 BA |

*Primary Examiner*—Jerry Smith
*Attorney, Agent, or Firm*—Blum, Moscovitz, Friedman & Kaplan

[57] ABSTRACT

An electronic wristwatch having a digital display and time-keeping apparatus for driving said digital display is provided with calculating means selectively coupled to said digital display. An input arrangement for said calculating means is provided consisting of a ring rotatably mounted on said wristwatch, and fixed and rotatable contact means respectively mounted on said wristwatch and ring for selective alignment at positions representative of the numerals 0 to 9 and at least one function character. Switch means is provided for applying the numerical or function character at which said ring is set to said calculating means, a further switch means being provided for selective setting of the wristwatch between a time keeping and calculating mode.

4 Claims, 5 Drawing Figures

ELECTRONIC WRISTWATCH INCORPORATING CALCULATOR

BACKGROUND OF THE INVENTION

This invention relates to improved electronic wristwatches, and in particular, to the provision of an electronic calculator capability within a wristwatch. In the art, wristwatches driven by electric and electronic means and powered by batteries, hereinafter generally referred to as electronic wristwatches are achieving gradually increasing acceptance. Further, electronic wristwatches are now becoming known wherein time is displayed in a digital form. Generally, light-emitting diodes or liquid crystal displays are the most popular forms of such digital displays. With the development of digital displays capable of operation at low power, it is expected that such digital displays will achieve wider acceptance since they are the most direct and effective devices for indicating time.

Electronic wristwatches provided with digital displays generally have six digits of numerical display, two of the digits displaying hours, two of the digits displaying minutes and two of the digits displaying seconds. The digital display is generally positioned on the dial at the surface of the time piece.

With the development of digital displays, miniaturization of the circuits of electronic wristwatches have been subjected to detailed study. Such circuits generally consist of a crystal oscillator for producing a high frequency time standard signal, a chain of frequency divider circuits for reducing the time standard signal to timing signals and driving circuitry for driving the display. At the present time, an electronic wristwatch incorporating a crystal oscillator, and a fifteen step frequency divider wherein the time standard frequency of 16,384 Hz is divided into 0.5 Hz, can be produced in a chip of 0.5 of mm. around. Thus, with the miniaturization of the electronic circuit presently occupying most of the space in the timepiece, additional space is provided sufficient for the provision of other electronic circuits within the case. It is proposed to utilize this space for incorporating a calculator within an electronic wristwatch.

SUMMARY OF THE INVENTION

Generally speaking, in accordance with the invention, an electronic wristwatch is provided having timekeeping means, a digital display, calculating circuit means, means for selectively coupling one of said timekeeping means and calculating means to said digital display, and means for providing an input to said calculating means. Said input means may consist of a ring member rotatably mounted on said wristwatch having discrete positions thereon associated with each of the numerical characters from 0 to 9 and at least one function character; fixed contact means mounted on said wristwatch and displaceable contact means mounted on said ring member for rotation therewith, one of said fixed and rotatable contact means including separate contact elements associated with each of said positions on said ring member for selection of the numerical or function character to be applied to said calculating means, and switch means for applying the selected character to said calculating means.

Accordingly, it is an object of the invention to provide an electronic wristwatch incorporating an electronic calculator.

A further object of the invention is to provide an electronic wristwatch incorporating a calculator having an easily manipulatable input device for said calculator.

An additional object of the invention is to provide an electronic wristwatch wherein a single display device is utilized for both time-keeping and calculating functions.

Still other objects and advantages of the invention will in part be obvious and will in part be apparent from the specification and drawings.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
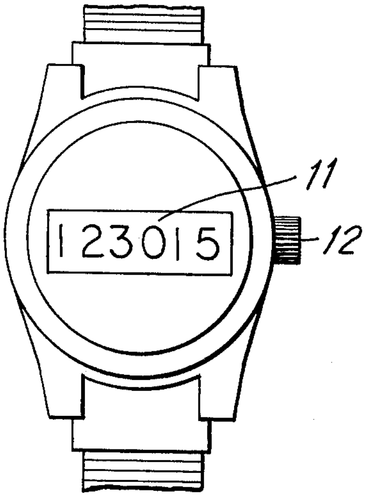
FIG. 1 PRIOR ART
FIG. 1 is a top plan view of a conventional digital electronic wristwatch.

Referring now to FIG. 1, a conventional electronic wristwatch is depicted, said wristwatch having a digital display 11 consisting of six digits and a switch 12 which, by being displaced outwardly in stages, may perform various functions for the watch such as 0-set and quick-feed in order to permit the setting of the wristwatch.

Figure 2:
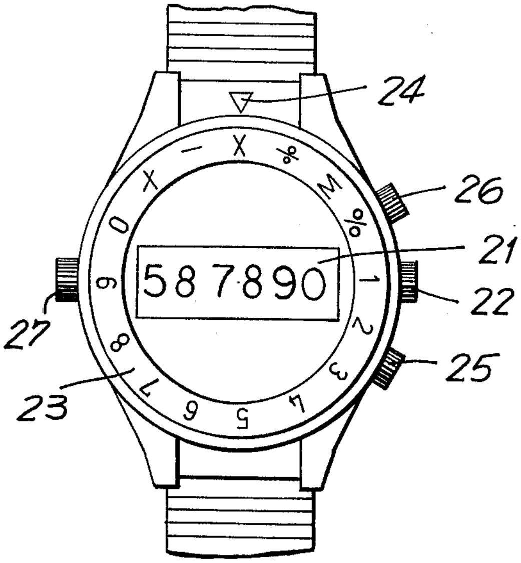
FIG. 2 is a top plan view of a digital electronic wristwatch in accordance with the invention.

Referring now to FIG. 2, the wristwatch in accordance with the invention is depicted incorporating a like digital display 21 also having six digits, and also including a switch 22 for performing the setting functions in connection with the time keeping operation of the watch.

Figure 5:
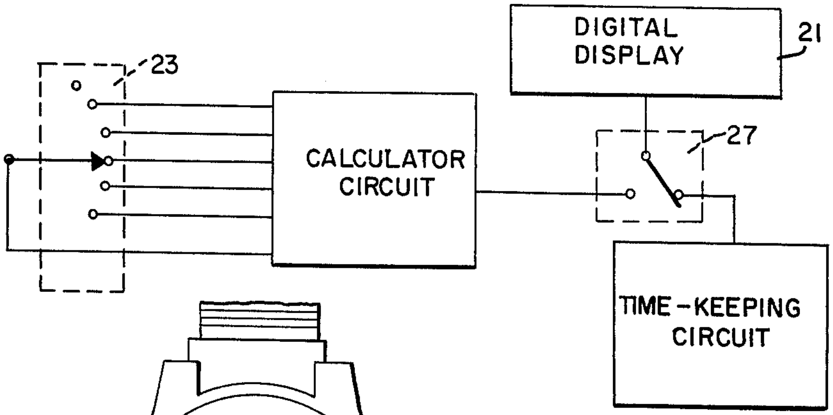
FIG. 5 is a circuit diagram of an electronic digital wristwatch constructed in accordance with the invention.
Figure 3:
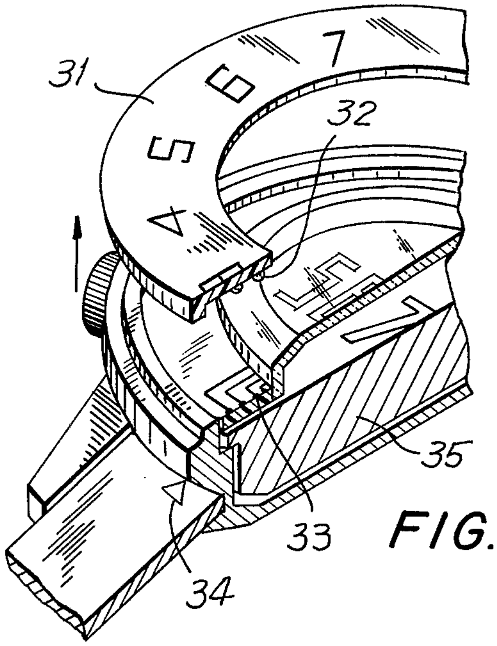
FIGS. 3 and 4 are fragmentary, exploded sectional views of first and second embodiments respectively of the wristwatch in accordance with the invention.

The wristwatch of FIG. 2 also incorporates calculating circuitry and is provided with a switch 27 which selectively connects either the time keeping or calculating circuitry depicted in FIG. 5 of the timepiece to the display device 21. A ring member 23 is rotatably mounted on the watch and serves as the input device for the calculating circuitry. The surface of said ring is inscribed with numerical characters from 0 to 9 and a plurality of function characters representative of addition, subtraction, multiplication, division, "sum of" and percent. The input function is performed by aligning the desired numerical or function character with mark 24 and pushing an input switch 25. The answer produced by the calculating circuit is displayed by display device 21. When more than six digits are required a shift switch 26 is pushed and the higher six digits of the answer are then displayed on display device 21. It is apparent that electric contact means must be provided in conjunction with ring member 23 in order to define a complete input device for the calculating circuit means. A first embodiment of such a contact arrangement is depicted in FIG. 3 wherein movable contacts 32 are mounted on the underside of ring 31, one set of contacts being associated with each of the positions at which a numerical or function character is disposed. A single set of fixed contacts 33 is mounted on watch movement 35 in alignment with mark 34. In the embodiment depicted, a four position binary coding arrangement is utilized, with four fixed contacts 33 being provided, the number and position of the contacts 32 at each position on the ring depending on the particular character at that position. When input switch 25 is pushed, a binary signal representative of the character in registration with mark 34 is applied to the calculating circuit. Movable contacts 32 are preferably grounded while fixed contacts 33 have a potential applied thereto. The calculating circuit would be designed so that data is read when the fixed contact is grounded.

Figure 4:
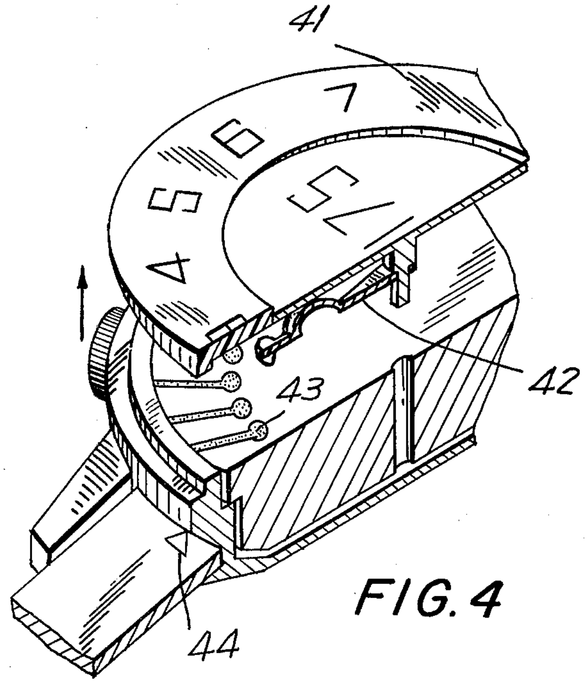

FIG. 4 depicts a second embodiment of the input arrangement in accordance with the invention. In this embodiment, ring member 41 is coupled to a central wiper 42 which rotates in conjunction with the rotation of the ring. A plurality of fixed contacts 43, one corresponding to each character on the face of ring 41, is provided. The fixed contacts are positioned so that when a character is aligned with mark 44, the corresponding fixed contact 43 is engaged by displaceable contact 42. At the desired relative position of the ring member and mark, the input switch would be pushed and data corresponding to the aligned character would be applied to the calculating circuit. As in the case of the embodiment of FIG. 3, movable contact 42 may be grounded while a potential is applied to fixed contacts 43. In such an embodiment, the calculating circuit would be designed so that data is read therein when a ground is detected.

It is recognized that the embodiments of FIGS. 3 and 4 are but two of many embodiments of input devices which may be incorporated in the wristwatch in accordance with the invention. The electronic wristwatch thus produced offers substantial advantages, and opens up a substantial market for such wristwatches.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An input device for an electronic wristwatch incorporating calculating means comprising a ring member rotatably mounted on said wristwatch, fixed contact means operatively coupled to said calculating means, displaceable contact means mounted for rotation with said ring member, and mark means on said wristwatch, said ring member having numerical characters representative of each digit from 0 to 9 and at least one function character applied thereto at discrete circumferentially spaced positions; at least one of said fixed and movable contact means including a plurality of contact elements respectively associated with said numerical and function characters and positioned for electrical engagement between the contact element associated with the character aligned with said mark means and the other of said fixed and movable contacts.

2. The input device for an electronic wristwatch as recited in claim 1, wherein said fixed contact means is mounted on said wristwatch in fixed positional relation to said mark means, said movable contact means including a plurality of contact elements mounted on said ring member, at least one of said contact elements being in registration with each of said character-associated positions.

3. The input device for an electronic wristwatch as recited in claim 2, wherein the contact elements associated with each character-associated position define a fourposition binary code, said fixed contact means having four contacts corresponding to the four positions of said binary code.

4. The input device for an electronic timepiece as recited in claim 1, wherein said fixed contact means includes a plurality of fixed contact elements mounted in circumferentially spaced relation on said wristwatch and a movable contact member mounted for rotation with said ring member and engagement with the fixed contact means contact member associated with the character in registration with said mark means.

* * * * *